United States Patent Office

2,900,644
Patented Aug. 25, 1959

2,900,644

HETEROGRAFT MATERIAL

Norman Rosenberg, Highland Park, and Eugene R. L. Gaughran, New Brunswick, N.J., assignors to Johnson & Johnson, a corporation of New Jersey No Drawing. Application November 1, 1955
Serial No. 544,368

11 Claims. (Cl. 3—1)

This invention relates to a tubular collagenous material suitable for implanting permanently or temporarily in a mammal, having its collagen fibrils substantially in their naturally produced relationship, containing at least 80% collagenous solids and not over about 20% of other or objectionable protein based on the weight of the solids therein, and more particularly relates to such a material which may be obtained from a mammalian tubular blood vessel and especially a bovine tubular blood vessel by substantial removal of the objectionable parenchymatous protein therefrom, especially by digestion with a proteolytic enzyme such as ficin followed by hardening with a tanning agent such as aqueous formaldehyde.

Various materials have been suggested heretofore for use as grafts in mammals, but so far as is known, the art is confronted by the problem of providing a suitable material therefor, especially in tubular form of the Y or T type which is readily available, capable of being preserved or stored, and is tolerable by the host (i.e., does not result in thrombosis, aneurysm, or rupture of the graft).

The discoveries associated with the invention and relating to solution of the above problems, and the objects achieved in accordance with the invention as set forth herein include: the provision of a tubular collagenous material substantially in its naturally produced form containing at least 80% collagenous solids and not over 20% objectionable protein; the provision of such a tube in T form, Y form, or any other branched form; the provision of a process for digesting a bovine tubular blood vessel with an enzyme such as aqueous ficin until the collagenous solids content of the tube is increased to at least 80%, washing with water and hardening by treatment with a hardening agent, such as aqueous formaldehyde; the provision of such a process followed by storing the washed products in a storage fluid such as 50% aqueous U.S.P. ethyl alcohol or isopropyl alcohol, which may contain a sterilizing agent such as 1% propylene oxide; the provision of such a process followed by freeze-drying; and other objects which will be apparent as details or embodiments of the invention are set forth hereinafter.

In order to facilitate a clear understanding of the invention, the following preferred specific embodiments are described in detail.

EXAMPLE I

A 3 gm. (wet weight) fresh beef carotid artery (freed of extraneous or perivascular tissue) is treated with 20 gms. of an aqueous solution of 1% of commercial ficin containing a trace (e.g., about 0.00005 to 0.005% by weight, preferably 0.0005%) of sodium thioglycollate (as enzyme activator) and standard phosphate-citrate buffer of pH 5 at a temperature of 37° C., for a time of 3 hours ("Handbook of Chemistry and Physics," Chemical Rubber Publishing Co., 30th edition, 1947, page 1405, McIlvaine standard buffer). It is then mechanically freed of loose tissue and washed with running water until the wash liquid is clear, and then treated by immersion in about 0.33% aqueous formaldehyde solution at 25° C. for 18 hours, and washed with slowly running water for about 15 hours.

The resulting material is tested for strength and freedom from leaks, e.g., by connecting one end of the tube to a source of air pressure, tying all other openings, immersing the whole assembly in water, and increasing the air pressure therein. Freedom from undue enlargement and from air leak at air pressure of at least 240 mm. Hg is regarded as indicating a satisfactory tube; and such tubes may be kept in 50% aqueous U.S.P. ethyl alcohol. For storage purposes, the finished product may be packaged in a sterilizing solution consisting of 1% propylene oxide in 50% aqueous U.S.P. ethyl alcohol.

Histological transverse sections thereof are prepared by the usual paraffin imbedding procedure, each specimen having a thickness of 7 microns. One specimen is stained with standard hematoxylin and eosin stain, and another specimen is stained with Verhoeff's connective tissue stain ("Biological Staining Methods," 5th edition, 1952, George T. Gurr, Ltd., London, England); and the resulting preparations are examined microscopically.

The specimens are composed of a dense outer layer of coarse collagen bundles which are strongly fuchsinophyllic, and an inner layer of thin laminated rings of collagen. They may contain a small or non-objectionable amount of incompletely digested smooth muscle tissue.

In gross observation, the product is white, the outer surface gives the appearance of spiral interlacing of coarse bundles of fibers, and the inner surface is smooth and glistens.

As an alternative hardening method, the digested tube may be treated in a chromic oxide bath for 45 minutes at room temperature, and then washed for one hour in running tap water. The tanning solution may be prepared as follows: a mixture of 103 gms. of ammonium dichromate and 178 gms. of concentrated sulfuric acid (about 96%) is diluted to one liter with water, and 24% (by weight) aqueous sodium bisulfite is added with agitation until a test for dichromate using diphenyl carbazide is no longer positive. The resulting preparation is brought up to three liters and stored for one week at room temperature. The aged chromic oxide solution, 2 ml. per gram of collagen, is diluted to 200 ml. for tanning.

A 57 lb. male mongrel dog was anesthetized with pentobarbital sodium (Nembutal). The anesthesia was given to affect an area extending from the pelvis to the xiphoid cartilage. This area was shaved, washed and painted with tincture of iodine. The abdominal cavity was entered via a medial incision extending from a point about 3 inches below the xiphoid cartilage to a point approximately 2 inches anterior to the border of the pubic bone. The lower abdominal aorta was exposed and mobilized following ligation of all tributaries in the operative area. Potts arterial clamps were applied below the left renal artery and above the iliac arteries, and a small section of aorta between the clamps was resected. Heparin was injected into the iliacs posterior to the lower Potts clamp.

A 3.7 cm. length of the above heterograft without branches (placed in a sterilizing solution consisting of 1% propylene oxide by weight in 50% U.S.P. ethyl alcohol, held for 7 days and stored in the sterilizing solution for 28 additional days before use) was washed in sterile saline for 15 minutes and used to bridge the defect resulting from the surgical resection of the aorta. The anterior and posterior anastomoses were completed by means of continuous everting mattress sutures covered with simple running stitches of 5–0 arterial silk. The clamps were then removed and blood flow re-established. The operative area was covered with peritoneum to prevent adhesion with the bowl. The abdominal incision was closed by means of interrupted 2–0 silk sutures.

This dog was sacrificed at 90 days and autopsied.

Gross findings

There was no gross evidence of dilatation. Two-thirds of the inner surface of the graft was covered with pseudo-endothelium which was smooth, glistening and indistinguishable from the endothelium of the host. An irregular rough area constituted the central portion of the graft.

Microscopic findings

Subacute inflammatory reactions were observed at both suture lines. Part of this reaction was in response to the presence of silk. Most of the graft was completely infiltrated with new fibrous tissue. Collagen deposition was greatest near the suture lines. There was no evidence of elastic tissue. The area described as pseudoendothelium was found to be composed of well differentiated fibrous tissue elements disposed in a longitudinal fashion. The central portion of the graft consisted of amorphous eosinophilic material devoid of nuclear elements. It was apparent that this unobjectionable mural thrombus was in the process of becoming organized.

These findings indicate that the graft was completely successful, inasmuch as no adverse effects appeared within 14 days (the usual time for gross failure, i.e., death of host, or paralysis of hind section); and, in addition, the graft was progressing well toward infiltration of new tissue.

EXAMPLE II

Following the procedure of Example I with a 67 lb. female mongrel dog and a heterograft which was stored in the sterilizing solution for 14 days beyond the 7-day sterilization period, a 3.3 cm. length of graft was implanted.

After 268 days, this dog is alive and leading an active life. It has palpable femoral pulses and shows no symptoms indicating failure of the heterograft.

These results indicate that the graft is completely successful.

EXAMPLE III

Following the procedure of Example I with a 40 lb. female mongrel dog and a heterograft prepared from calf carotid artery digested for 6 hours in the enzyme solution, hardened in methyl alcohol for one hour, and stored in the sterilizing solution for 2 days beyond the 7-day sterilizing period, a 2.1 cm. length of graft was implanted.

This dog was sacrificed at 59 days. The gross picture was the same as in Example I, with the exception that pseudoendothelium covered a smaller portion of the graft (approximately ¼). Organization of the graft had advanced to a considerable extent and the usual tissue reaction in response to the graft had substantially subsided. The sections studied appeared completely free from elastic tissue or muscle.

These results indicate a completely successful graft.

EXAMPLE IV

Following the procedure of Example I with a 48 lb. male mongrel dog and a heterograft prepared from calf carotid artery having one branch which was tied off and stored in the sterilizing solution for 12 days beyond the 7-day sterilizing period; a 5.2 cm. length of graft was implanted.

This dog was sacrificed at 21 days. There was no evidence of dilatation. The beginning of a endothelium-like lining could be seen at both suture lines. The luminal surface of the graft was relatively smooth with the exception of an irregular area representing a thin, closely adherent mural (non-objectionable) thrombus. The indented suture lines were both filled with organized thrombi, parts of which extended for short distances towards the center of the graft (these also are not objectionable). Most of the graft was recognizable though evidence of infiltration was seen in that portion closest to the lumen.

This again is a demonstration of a completely successful graft.

EXAMPLE V

Following the procedure of Example I with a 42 lb. male mongrel dog and a heterograft prepared from calf carotid artery, stored in the sterilizing solution the 7-day sterilizing period, a 3.4 cm. length of graft was implanted.

The dog was sacrificed at 14 days. There was no evidence of dilatation. The beginning of an endothelium-like lining was visible at both suture lines. The luminal surface was bright red in color, nodular in the center and relatively smooth elsewhere. The microscopic picture was one of slight remaining (usual) tissue reaction, with modest amount of mononuclear leukocytes disposed on the surface of the graft and also at the anastomoses. The luminal surface was lined by a thin thrombus below which evidence of the original graft collagen could be seen.

These observations show that the graft was completely successful (at 14 days), and also that infiltration by new tissues was under way at the end of the test period.

EXAMPLE VI

Following the procedure of Example I with a 45 lb. male mongrel dog and a heterograft stored in the sterilizing solution for the 7-day sterilizing period, a 4.1 cm. length of graft was implanted.

After 184 days, this dog is alive and leading an active life. It has palpable femoral pulses and shows no symptoms indicating failure of the heterograft.

These results again indicate a completely successful graft.

EXAMPLE VII

Following the procedure of Example I with a 56 lb. female mongrel dog and a heterograft sterilized by immersion in undiluted ethylene oxide for ½ hour and then aseptically transferred to a sterile tube and subjected to freeze-drying (by the analogy to the procedure of Lehr, H. B., Blakemore, W. S., Sawyer, P. N., Glauser, and Johnson, J., "An Apparatus for the Preparation of Homologous Arterial Grafts by Freeze-Drying," Surgery, 37(4): 576–584, 1955, using an ordinary chamber) and the tube sealed under vacuum, a 4.2 cm. length of graft was implanted.

After 184 days, this dog is alive and leading an active life. It has palpable femoral pulses and shows no symptoms indicating failure of the heterograft.

These results again indicate a completely successful graft.

Comparable or analogous results to the foregoing may be achieved with various modifications thereof, including the following. A tubular mammalian vessel is used as a starting material, and desirably a bovine blood vessel, including those having Y or T type or other branched form.

The enzyme solution may be commercial ficin material or a purified or concentrated material containing the proteolytic enzyme and may be used in a concentration in the range of about 0.25 to 5.0% of active ficin, desirably 0.5 to 2.0%, and preferably 0.5 to 1.5%, the higher concentration resulting in faster digestion. The digestion temperature may be at the range of 30 to 45° C., desirably 34 to 40° C., and preferably 36 to 38° C.; the higher temperature giving faster digestion. The parts by weight of artery (wet) relative to enzyme solution may be in the range of 1 to 3 per 10 parts of solution, desirably 1 to 2, and preferably 1.5. The treating solution should be buffered and the pH may be in the range of 4.0 to 7.0, desirably 4.5 to 6.0, and preferably 5.0 to 5.5, the latter giving the faster digestion. The digestion times may be in the range of 2.0 to 8.0 hours, desirably 2.5 to 6.0, and preferably 2.5 to 3.0 hours. The concentration, amount, pH, temperature and time are selected to give the desired increase in collagenous solids content.

The treatment with aqueous formaldehyde may be in a concentration in the range of 0.3 to 3.3, desirably 0.3 to 1.0, and preferably 0.3 to 0.5%; at a temperature in the range of 10 to 35° C., desirably 20 to 35, and preferably 25 to 30° C.; at a time in the range of 4 to 24 or more, desirably 15 to 20, and preferably 17 to 18. Atmospheric or elevated pressure may be used.

Other hardening agents giving equivalent handling properties may be employed, such as glyoxal, chromic oxide, anhydrous alcohol such as methanol, ethanol and the like.

The sterilization may be by treatment with an alkylene oxide such as ethylene oxide or propylene oxide, beta-propiolactone, or dilute aqueous formaldehyde.

In view of the foregoing disclosures, variations or modifications thereof will be apparent, and it is intended to include within the invention all such variations and modifications except as do not come within the scope of the appended claims.

We claim:

1. A tubular collagenous material useful for implanting in a mammal, which tubular material contains at least 80% by weight collagenous solids, the outer surface thereof giving the appearance of spiral interlacings of coarse bundles of fibers and the inner surface thereof being smooth.

2. A material of claim 1 in T form.

3. A material of claim 1 in Y form.

4. A process for preparing an implant of tubular collagenous material which comprises digesting a bovine tubular blood vessel with ficin at a combination within the range of the ficin concentration being within the range of 0.25 to 5.0%, the temperature being within the range of about 30 to 45° C., the pH of a solution being within the range of 4.0 to 7.0, and the time being within the range of about 2 to 8 hours such that the collagen content thereof is increased to at least 80%, and washing with water to remove the enzyme.

5. A process of claim 4 followed by treatment with a hardening agent to improve the handling properties of the material.

6. A process of claim 5 wherein the treatment is with aqueous formaldehyde of a concentration within the range of 0.3 to 3.3%, at a temperature within the range of 10 to 35° C., for a time within the range of 4 to 24 hours.

7. A process of claim 5 wherein the hardening agent is chromic oxide.

8. A process of claim 6 wherein the hardening agent is methanol.

9. A process of claim 5 followed by sterilization.

10. A process of claim 9 wherein the sterilization is by means of propylene oxide.

11. A process of claim 9 wherein the sterilization is by means of ethylene oxide.

References Cited in the file of this patent

UNITED STATES PATENTS

| | | |
|---|---|---|
| 1,999,641 | Sharp | Apr. 30, 1935 |
| 2,127,903 | Bowen | Aug. 23, 1938 |
| 2,215,453 | Buchgraber | Sept. 24, 1940 |
| 2,475,697 | Cresswell | July 12, 1949 |

OTHER REFERENCES

Biochemical Journal, vol. 46, 1950, pages 384–387. (Copy in Scientific Library.)

Creech et al.: Preparation of Arterial Nomographs, Annals of Surgery, vol. 140, No. 1, pages 35–43, July 1954.